April 25, 1933. C. W. LEGUILLON 1,905,916
METHOD AND APPARATUS FOR TREATING TEXTILE MATERIAL
Filed Jan. 8, 1930
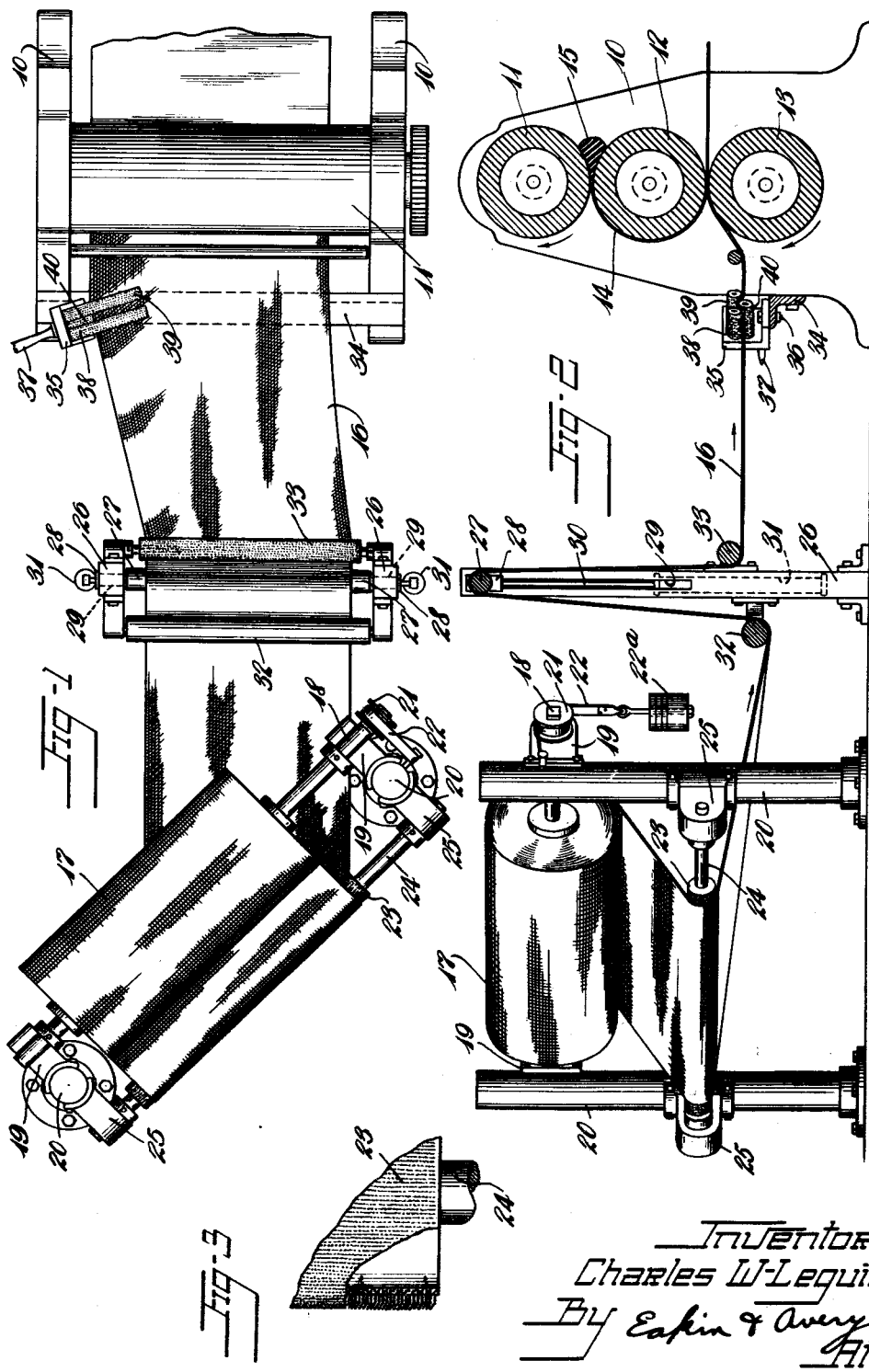
Inventor
Charles W. Leguillon
By Eakin & Avery
Atty.

Patented Apr. 25, 1933

1,905,916

UNITED STATES PATENT OFFICE

CHARLES W. LEGUILLON, OF AKRON, OHIO, ASSIGNOR TO THE B. F. GOODRICH COMPANY, OF NEW YORK, N. Y., A CORPORATION OF NEW YORK

METHOD AND APPARATUS FOR TREATING TEXTILE MATERIAL

Application filed January 8, 1930. Serial No. 419,395.

This invention relates to methods and apparatus for treating textile material, and more especially to procedure and mechanism for skewing or distorting the weave of square woven fabric and then treating the fabric while it is so distorted to cause it to retain that condition.

The invention is especially useful for the manufacture of breaker strip fabric for pneumatic tire casings, especially tire casings of the drum-built or pulley-band type, in which the bias-cut breaker fabric is required to stretch extensively lengthwise of the strip as the tire-band is shaped to tire form. Such stretching of the breaker strip excessively strains it and excessively elongates and narrows the interstices between its threads if the strip is simply formed by bias-cutting it from a sheet of rubberized breaker fabric coated with rubber while it is in an undistorted condition with its threads crossing each other at right angles. To avoid these results the breaker fabric has been held in a distorted condition while the rubber is applied to it so that the spaces between the threads are held by the rubber to an elongated rhombus shape, the fabric then being bias cut in such direction that the rhombus-shaped spaces, filled with rubber, extend cross-wise of the breaker strip, which allows for the extensive stretching of the breaker strip in the shaping of the tire and leaves the threads of the strip more nearly at right angles to each other in the finished tire than they are if the fabric is calendered in an undistorted condition.

The chief objects of this invention are to provide an improved method and to provide improved apparatus for distorting and rubberizing breaker-strip fabric or the like; to reduce the number of operators required to produce material of the character mentioned; and to increase the proportion of perfect material produced, with resulting reduction of waste.

In the accompanying drawing:

Fig. 1 is a plan view of apparatus embodying and adapted to carry out my invention in its preferred form.

Fig. 2 is a side elevation thereof, parts being broken away and in section.

Fig. 3 is a fragmentary side elevation of a guide-roller embodied in my invention, a part thereof being broken away and in section.

Referring to the drawing, 10, 10 are side frames and 11, 12, 13 are the respective rolls of a three roll calender of known construction which is driven in the usual manner by drive mechanism (not shown). The calender is adapted to form a sheet of rubber 14 on its roll 12 from a supply mass of rubber 15 fed into the nip of the rolls 11, 12, and to apply said sheet 14 to a sheet of fabric, such as the continuous sheet of fabric 16, which is fed between the rolls 12, 13 of the calender.

The sheet of fabric 16 is drawn from a supply roll 17 of the same which is mounted upon a rotatable horizontal shaft 18 journaled in brackets 19, 19, the latter being mounted upon respective posts or standards 20, 20. The shaft 18 is provided with the usual brake-drum 21 over which is suspended a weighted brake band 22, the weight 22a of which may be increased or diminished as occasion requires. The standards 20 are so positioned that the axis of the roll 17 of fabric is oblique with relation to the axes of the calender rolls 11, 12 and 13. Below the shaft 18 and to the rear thereof is an idler guide-roller 23 disposed parallel to the shaft 18, and having a surface covering of carding cloth which has its wire teeth bent in axial planes with relation to the roller and toward the long margin of the fabric, as shown in Fig. 3, to prevent slippage of material longitudinally of the roll toward the calender. The roller 23 is mounted upon a shaft 24 which is journaled in respective brackets 25, 25 mounted upon the standards 20.

Positioned between the calender and the supply-roll supporting structure just described is a tension compensating device comprising upright standards 26, 26 in which is mounted a vertically movable roll 27. The latter is disposed parallel to the calender rolls and has its end portions journaled in bearing blocks, 28, 28 which are mounted in vertical slideways 29, 29 formed in the upper portions of the respective standards 26. The bearing blocks 28 are secured to the upper ends of respective piston rods 30 of vertically positioned fluid pressure cylinders 31, 31 which are connected at their lower ends by suitable pipes (not shown) to a source of pressure fluid. The arrangement is such that the roll 27 is normally urged upwardly by determinate fluid pressure.

Mounted in suitable journal brackets upon the standards 26, below the slideways 29 therein, are guide-rollers 32, 33 disposed parallel to the roll 27. The guide roller 33, mounted upon the side of the standards nearest the calender, has a surface covering of carding cloth, the teeth of which lie in an axial plane with relation to the roller. The guide-roller 32 is mounted upon the opposite side of the standards. The sheet of fabric 16 passes under the roller 32, over the roll 27, and under the roller 33 in its passage from the supply roll 17 to the calender, thus providing a storage loop of fabric which will shorten as the pull required to unwind the sheet 16 from the roll 17 increases with the diminishing of the diameter of the latter, thus apprising the operator that the braking weight 22a requires to be decreased. Thus the sheet 16 is caused to pass into the calender under substantially uniform and constant tension.

Mounted upon one of the calender frames 10, on the side toward the tension device just described, is a tentering device comprising a support 34, an angular bracket 35 pivoted thereon at 36, said bracket being provided with a handle 37 for manual manipulation, and three tentering rollers 38, 39, 40 journaled on the bracket 35 and projecting therefrom in parallel relation. The rollers 38 and 39 are spaced apart from each other in a horizontal plane, and the roller 40 is positioned in a lower, intermediate position. The arrangement is such that the adjacent margin of the sheet 16 passes beneath the rollers 38, 39 and over the roller 40, being engaged by the surfaces of said rollers by reason of their positions with relation to each other. With relation to the constant-tension device, the tentering rollers are disposed beyond the end of the roll 33 so that the margin of the sheet 16 is drawn laterally in passing from the roller 33 to the calender, the tentering rolls being held in a suitably oblique position to produce a tentering effect upon the sheet.

In the operation of the apparatus, the sheet 16, being initially threaded through the apparatus as shown, is withdrawn from the supply roll 17 by the pull imparted by the calender, and in passing to the latter, travels around the guide-roller 23, through the constant-tension device as described, and past the tentering device, the sheet entering the calender between the rolls 13 and 12 and receiving from the latter, on its upper face, the sheeted rubber 14 formed thereon.

Because of the oblique position of the supply roll 17 and guide roller 23 with relation to the direction in which the sheet 16 is drawn from the latter, the longitudinal or warp threads of the sheet are pulled from the guide roller 23 at an angle to the positions in which they lie thereon, and the tension under which the fabric is pulled from the guide roller, although it is lengthwise of the warp threads as they lie at a distance from the guide-roller, is oblique to the weave of the fabric at the position where the latter passes tangentially from the guide roller, with the result that such oblique tension distorts to diamond shape the initially square figures represented by the weave of the fabric, the weft threads continuing to lie approximately parallel to the oblique guide roller, their action being comparable to that of a "parallel motion" device as the weave is distorted to rhombus form.

The teeth of the carding cloth on the guide-roller 23 are inclined in an axial plane with relation to the roller, which prevents slippage of the fabric toward the end of the guide-roller at the short side of the sheet. Thus the oblique force which pulls the fabric around said roll has a component pulling force which is oblique with relation to the square meshes of fabric still in contact with the guide-roller 23 and is opposed by their natural resistance to distortion. The pull of this component force extends toward the long side of the fabric, through the weft threads, and, as it cannot extend beyond the margin thereof, the absence of any resistance to it beyond the long margin of the fabric results in a slight curling of the said margin as it leaves the roller 23. The lack of anchorage of the weft threads beyond the long margin permits the longitudinal or warp strands thereat to proceed with relatively low tension and this causes the weft strands to assume a curvature along a narrow marginal region, substantially as shown in Fig. 1.

The curvature of the weft strands at the long margin of the fabric is removed or materially reduced by the tentering device which engages said marginal portion, and by laterally directed pull and localized deflection of the imperfectly skewed margin, causes such deviation in the course thereof as to retard said margin and to impart additional tension upon the warp and weft strands of the sheet, with the result that the curved weft strands are substantially straightened. The pull exerted by the tentering device is controlled by the angular position of the device with relation to the course of the sheet of fabric, and an operator is provided for manipulating the tentering device to assure its proper angularity, since the marginal curvature of the weft strands may vary due to non-uniformity or distortion of the weave in the supply roll 17, and variation of tension in the latter as it lies in the roll.

The carding cloth coverings of the guide-roller 33 and the tentering rollers prevent slippage or creeping of the sheet 16 thereon, in an axial direction, as the result of the lateral pull of the tentering device, so that the longitudinal component of the pull is largely localized in the region between the tentering device and the calender.

As the carding cloth upon the guide-roller 23 compels true running of the fabric thereover, the guide-roller alone serves as holdback means for the fabric, and consequently it may be simply journaled, in stationary bearings, relatively remote from the supply roll 17. The advantages resulting from this arrangement are that the guide-roller does not need to bear upon the supply roll, as in the prior art, and therefore does not need to be shifted or otherwise manipulated during the mounting of the supply roll 17. The teeth of the carding cloth engage the strands of the fabric sheet as it passes around the roller 23 and positively prevent slippage of the sheet axially of the guide-roller, with resulting uniformity of weave in the distorted fabric.

The application of the sheet of plastic rubber 14 to the sheet 16 while the latter is in skewed condition assures that the sheet will retain its skewed condition permanently after the distorting forces are removed.

Experience has shown that skewed fabric produced in the manner and by the apparatus described possesses such uniformity that practically all of it may be utilized, there being little or no waste other than its selvage edges. Also it is possible to obtain greater angularity of the oblique weft strands than is possible with apparatus heretofore used for this purpose.

Modifications may be resorted to within the scope of the appended claims, as I do not limit my claims wholly to the specific construction shown or the exact procedure described.

I claim:

1. In apparatus for treating textile material, the combination of means for feeding a sheet of the material longitudinally in an angular course to skew the weave of the material, and a roller engaging the fabric at the angle of said course, said roller being provided with integral means to prevent the slippage of the fabric upon its surface.

2. In apparatus for treating textile material, the combination of a support for a roll of said material, means for withdrawing material from said roll, said withdrawing means being in non-aligned relation to said roll, and a guide roller having a surface covering of carding cloth disposed parallel to the axis of the roll of material and engaging the material withdrawn therefrom.

3. Apparatus as defined in claim 2 in which the guide roller is disposed at an intermediate position in the course of the material.

4. In apparatus for treating textile material, the combination of a support for a roll of said material, means for withdrawing a sheet of material from said roll, said withdrawing means being in non-aligned relation to said roll, a guide-roller engaging the sheet and having a surface covering of carding cloth, the teeth of which are disposed in axial planes with relation to the said guide-roller, and a tentering device engaging the material in a region between said guide-roller and the sheet-withdrawing means.

5. In apparatus for treating textile material the combination of a support for a roll of the material, means for withdrawing a sheet of material from said roll, said withdrawing means being in non-aligned relation to said roll, a guide roller having a surface covering of carding cloth disposed parallel to the roll of material and engaging the sheet withdrawn therefrom, a tentering device engaging a margin of the sheet in the region between said guide-roller and the sheet-withdrawing means, and means for localizing the effect of the tentering device.

6. Apparatus as defined in claim 5 in which the means for localizing the effect of the tentering device comprises a roller covered with carding cloth.

7. In apparatus for treating textile material, the combination of a support for a roll of said material, a calender disposed in non-aligned relation to said roll and adapted to withdraw a sheet of material therefrom and apply a plastic coating thereto, means intermediate said support and said calender for diverting the course of the sheet in a manner to skew the weave thereof after it is withdrawn from its roll, and means engaging the skewed sheet before it passes through the calender for tentering the sheet.

8. The method of treating textile material which comprises longitudinally feeding a sheet of material from a supply position, laterally diverting the sheet edgewise at a distance from said position to skew the greater portion of the weave thereof, and then tentering only the imperfectly skewed trailing margin of the sheet to further skew the sheet locally adjacent said margin.

9. The method of treating textile material which comprises feeding a sheet of material from a supply roll, laterally diverting the sheet edgewise at a distance from the supply roll to skew the greater portion of the weave thereof, and completing the skewing operation by locally retarding only the imperfectly skewed trailing margin of the sheet by an angularly directed force applied to said margin.

10. The method of treating textile material which comprises longitudinally feeding a sheet of the material from a supply position, laterally diverting the sheet edgewise at a distance from said position to skew the greater portion of the weave thereof, tentering only the imperfectly skewed trailing margin to further skew the sheet, and calendering a layer of rubber onto the sheet to retain the sheet in skewed condition.

11. Apparatus for treating textile material which apparatus comprises means for longitudinally feeding a sheet of the material from a supply thereof, means located at a distance from said supply for laterally diverting the sheet edgewise to skew the greater portion of the weave of the material, and tentering means so engaging only the imperfectly skewed trailing margin of the sheet as to further skew the sheet locally adjacent said margin.

12. Apparatus for treating textile material which apparatus comprises means for longitudinally feeding a sheet of the material in a straight initial path from a supply thereof, means located at a distance from said supply for laterally diverting the sheet edgewise at an angle to said path to skew the greater portion of the weave of the material, and tentering means so engaging only the imperfectly skewed trailing margin of the sheet as to further skew the sheet locally adjacent said margin.

13. Apparatus as defined in claim 11 in which the tentering means comprises a guide roller covered with carding cloth.

14. Apparatus for treating textile material the said apparatus comprising a supply roll for the material, means for pulling the material from the supply roll by feeding it in a direction oblique thereto, and means intermediate the supply roll and the said pulling means for compelling the material to run true as it passes thereto from the supply roll and for resisting the pull of the said pulling means to skew the material.

In witness whereof I have hereunto set my hand this 17th day of December, 1929.

CHARLES W. LEGUILLON.